(12) United States Patent
Abbo et al.

(10) Patent No.: US 7,689,848 B2
(45) Date of Patent: Mar. 30, 2010

(54) POWER MANAGEMENT ADAPTED TO COMPUTE AVERAGE LENGTH OF TIME THAT A PROCESSOR IS IDLE DURING EACH PROCESSING CYCLE FROM SYNCHRONIZATION SIGNALS

(75) Inventors: Anteneh A. Abbo, Eindhoven (NL); Vishal Choudhary, Veldhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 568 days.

(21) Appl. No.: 11/570,515

(22) PCT Filed: Jun. 8, 2005

(86) PCT No.: PCT/IB2005/051875
§ 371 (c)(1),
(2), (4) Date: Dec. 13, 2006

(87) PCT Pub. No.: WO2006/000929
PCT Pub. Date: Jan. 5, 2006

(65) Prior Publication Data
US 2007/0266268 A1    Nov. 15, 2007

(30) Foreign Application Priority Data
Jun. 21, 2004   (EP) .................................. 04102845

(51) Int. Cl.
*G06F 1/00* (2006.01)
*G06F 1/32* (2006.01)
*G06F 1/12* (2006.01)

(52) U.S. Cl. ........................ 713/322; 713/320; 713/400

(58) Field of Classification Search .................. 713/322
See application file for complete search history.

(56) References Cited

U.S. PATENT DOCUMENTS 6,141,762 A * 10/2000 Nicol et al. .................. 713/300
6,275,969 B1    8/2001 Lakshminarayana et al.

(Continued)

OTHER PUBLICATIONS

Luca Benini; "A Survey of Design Techniques for System-Level Dynamic Power Management", IEEE Transactions in Very Large Scale Integration (VISI) Systems, vol. 8, No. 3, Jun. 2000.

(Continued)

*Primary Examiner*—Suresh K Suryawanshi
(74) *Attorney, Agent, or Firm*—Larry Liberchuk (57) ABSTRACT

A SIMD processor architecture (2) for processing a stream of data vectors is provided, the architecture comprising a processor array (4) comprising a plurality of processors (PE(0), . . . , (PE(N)), each processor ((PE(0), . . . PE(N)) being adapted to process a data element in each vector, the operation of the processor array (4) being controlled by a local clock signal having a first frequency; a control processor (16) adapted to control the operation of the SIMD processor architecture (2) and generate signals to synchronize the operation of the processor array (4) with the stream of data vectors, the operation of the control processor (16) being controlled by a local clock signal having a second frequency; and power management means (30) for adjusting the frequencies of the local clock signals in response to the synchronization signals generated by the control processor (16), thereby minimizing the power consumption of the SIMD processor architecture (2).

15 Claims, 5 Drawing Sheets

U.S. PATENT DOCUMENTS

| | | | |
|---|---|---|---|
| 6,647,502 B1 | 11/2003 | Ohmori | |
| 7,076,681 B2* | 7/2006 | Bose et al. | 713/600 |
| 2002/0169990 A1* | 11/2002 | Sherburne, Jr. | 713/300 |
| 2003/0110406 A1* | 6/2003 | Takada | 713/320 |
| 2004/0098631 A1* | 5/2004 | Terrell, II | 713/322 |

OTHER PUBLICATIONS

Luca Benini; "System-Level Power Opotimization: Techniques and Tools", DEIS Univ Di Bologna, Italy, and Giovanni De Micheli, CSL Stanford Univ.

David Katz et al; "Dynamic Power Management Optimizes Performance vs. Power in Embedded Applications of Blackfin DSPS", Analog Dialogue 36-04 2002.

N. O'Connor et al; "Hardware Acceleration Architectures for MPEG-Based Mobile Video Platforms: A Brief Overview", Visual Media Proc. Group, Dublin City Univ., Glasnevin, Dublin 9, Ireland.

Arun F. Rodrigues; "Rudra: A Reactive Dissipation Reducing Architecture", Dept. of Computer Science and Eng. Notre Dame, Indiana, May 2003.

Tajana Simunic et al; "Dynamic Power Management of Laptop Hard Disk", Stanford Univ. and Univ. of Bologna.

Donghwan Son et al; "Dynamic Voltage Scaling on MPEG Decoding", School of Eng. Inf. and Comm. Univ. Taejon Korea and Computer & Software Tech. Lab Electronics and Telecomm. Research Inst. Taejon Korea.

"VLSI for Multimedia Applications—CAS Study: Digital TV", http://vlsi.wpi.edu/webcourse/digittv/digittv.html.

Simcha Gochman et al; "The Intel Pentium M Processor: Microarchitecture and Performance", Intel Technology Journal, Intel Centrino Mobile Technology, vol. 7, Issue 2, May 21, 2003, ISSN 1535-864X.

Jan M. Rabaey; "Issues in Low Power Design—Architecture and System Level", Advanced IC Design 2001, Univ. of California@Berkeley.

* cited by examiner

POWER MANAGEMENT ADAPTED TO COMPUTE AVERAGE LENGTH OF TIME THAT A PROCESSOR IS IDLE DURING EACH PROCESSING CYCLE FROM SYNCHRONIZATION SIGNALS

TECHNICAL FIELD OF THE INVENTION

The present invention relates to the field of electronic circuits, and particularly to a method and apparatus for managing the power consumption in an electronic circuit.

BACKGROUND TO THE INVENTION

Energy efficient system design in portable, battery-operated electronic devices has become increasingly important since energy consumption dictates the battery lifetime of a portable system, and this is a crucial performance metric for the success of any product in the consumer market. Thus, power management is becoming an indispensable part of the system infrastructure.

Dynamic power management (DPM) is a design methodology that enables the dynamic configuration or reconfiguration of a system for energy or power efficient computation. In "A Survey of Design Techniques for System-Level Dynamic Power Management" IEEE Transactions on VLSI Systems, Vol. 8, No. 3, June 2000 by L. Benini, A. Bogliolo and G. de Micheli, several DPM techniques are discussed. These techniques involve switching off or 'slowing down' idle parts of the system, and dynamically trading system performance for energy efficiency. DPM techniques provide ways to optimize and control the system power by tuning the performance of the individual system components to the varying workload.

In systems with a dynamically varying workload, that is, in systems that do not have to deliver a peak or maximum performance all of the time, the voltage and clock frequency can be controlled to optimise the power consumption of the system. This is known as dynamic voltage and frequency scaling (DVFS).

Many techniques have been proposed in literature for such systems, mostly scaling the voltage and frequency depending on the performance requirements. For example, in "Dynamic Voltage Scaling on MPEG Decoding" by D. Son, C. Yu and H. Kim an application based technique is proposed in which the voltage and frequency are adjusted depending on the decoding performance of the application.

Where the system is used to process a data stream with a high degree of parallelism, such as a stream of image data, single-instruction multiple-data (SIMD) processors can be used. The SIMD processor exploits the parallelism in the data stream to permit a lower operating frequency and memory localisation, which translates into lower power dissipation relative to a single-instruction, single-data processor operating on the same data stream.

SUMMARY OF THE INVENTION

Although SIMD processors require less power than single-instruction, single data processors, further power savings are desirable.

Therefore, it is an object of the present invention to provide a power management technique for single-instruction, multiple-data (SIMD) processor architectures that further reduces the power consumption.

According to a first aspect of the present invention there is provided a SIMD processor architecture for processing a stream of data vectors, the architecture comprising a processor array comprising a plurality of processors, each processor being adapted to process a data element in each vector, the operation of the processor array being controlled by a local clock signal having a first frequency; a control processor adapted to control the operation of the SIMD processor architecture and generate synchronisation signals to synchronise the operation of the processor array with the stream of data vectors, the operation of the control processor being controlled by a local clock signal having a second frequency; and power management means for adjusting the frequencies of the local clock signals in response to the synchronisation signals generated by the control processor, thereby minimising the power consumption of the SIMD processor architecture.

According to a second aspect of the present invention, there is provided a method of minimising the power consumption of a SIMD processor architecture, the SIMD processor architecture being suitable for processing a stream of data vectors and comprising a processor array having a plurality of processors, each processor being adapted to process a data element in each data vector, the operation of the processor array being controlled by a local clock signal having a first frequency; and a control processor adapted to control the operation of the SIMD processor architecture and generate synchronisation signals to synchronise the operation of the processor array with the stream of data vectors, the operation of the control processor being controlled by a local clock signal having a second frequency; the method comprising adjusting the frequencies of the local clock signals in response to the synchronisation signals generated by the control processor.

BRIEF DESCRIPTION OF DRAWINGS

For a better understanding of the present invention, and to show more clearly how it may be carried into effect, reference will now be made by way of example to the following drawings, in which.

DETAILED DESCRIPTION OF THE PREFERRED EMBODIMENTS

As mentioned above, one use of single-instruction multiple-data processors is in vector-based signal processing applications (for example in processing video streams). SIMD processor architectures are known to be efficient for low-level pixel processing. Although SIMD processors have good power dissipation figures due to clock gating and from the inherent advantages of parallel processing, considerable power savings can be further achieved by intelligently controlling the voltage and frequency in the processor architecture.

Figure 1:
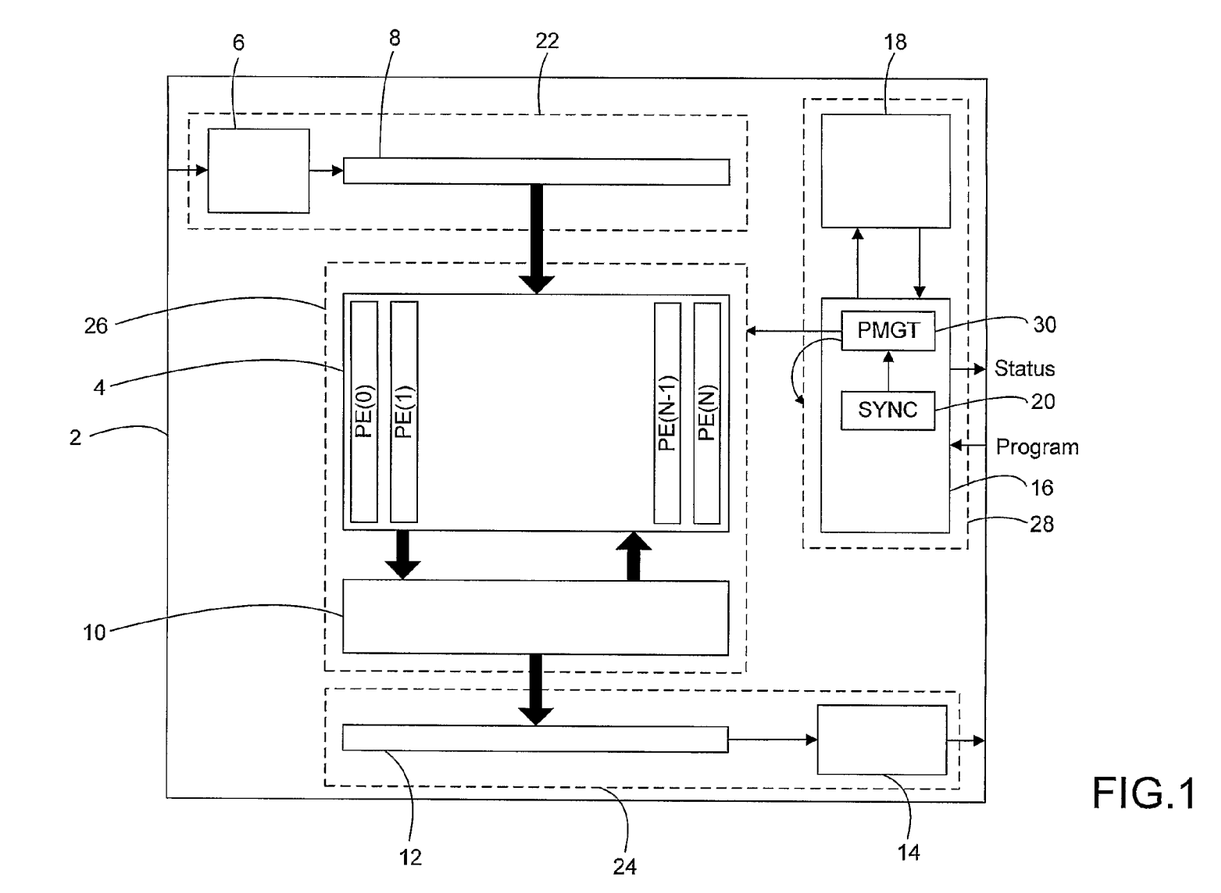
FIG. 1 is block diagram of a single-instruction, multiple-data processor architecture in accordance with the invention.

FIG. 1 shows a SIMD processor architecture 2 in accordance with the invention. The processor architecture 2 comprises a linear processor array 4 having N+1 processing elements (PEs). A data stream input into the processor architecture 2 is passed through an input pre-processor 6 that collects and pre-processes data into an appropriate vector format, and loads this into an input vector buffer 8. The vector stored in buffer 8 is read out to the processor array 4 in parallel.

Once the vector has been processed by the processor array 4, the vector is passed to a working vector memory 10. If required by the processing algorithm, the working vector memory 10 can pass the vector data back into the array 4 for further processing.

Once the vector has been fully processed by the array 4, the vector is loaded, in parallel, into an output vector buffer 12. An output postprocessor 14 reads the processed vector data and processes the vector data into a suitable data stream for sending out of the architecture 2.

Computation in the SIMD processor is typically pipelined at vector (line) level, i.e., while the input pre-processor 6 collects and pre-processes data entities of the 'next' vector, the linear processor array 4 works on the 'current' vector. In the meantime, the output post-processor 14 processes data entities of the 'previous' vector for sending out.

A global control processor 16 is provided to control the synchronization between the blocks in the processor architecture 2. The input pre-processor 6 is required to inform the global control processor 16 about the arrival of a new vector and the global control processor 16 informs the output post-processor 14 about the completion of the processing of a vector.

Figure 2:
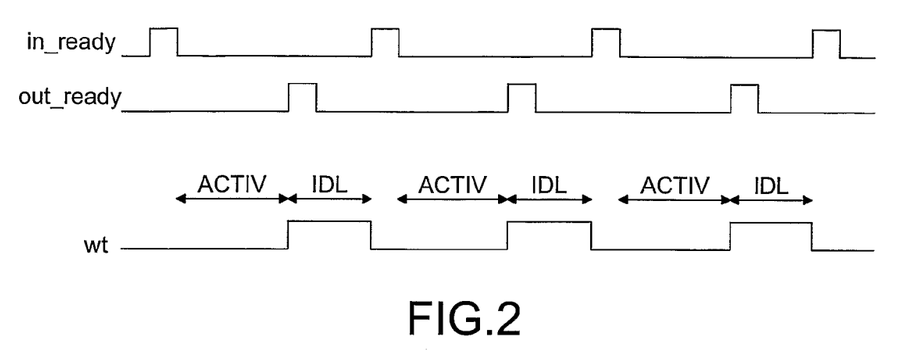
FIG. 2 is a timing diagram illustrating the relationship between active and idle processing periods.

FIG. 2 is a timing diagram that shows the timing of a typical signal processing task. The arrival of an input vector (in_ready/new_vector) signals the start of algorithm execution. Completion of processing (out_ready) tells the output post-processor 14 to resume output streaming. The wait signal shows the periods when the linear processor array 4 is idle.

As in a conventional SIMD processor, the global control processor 16 is responsible for fetching an instruction or program from a program memory 18 and for decoding and dispatching the instruction to the linear processor array 4. The global control processor 16 comprises a synchronisation block 20 that is responsible for synchronising the processing of tasks in the linear processor array 4.

It is noted that, for ease of illustration, the connections between the global control processor 16 and the input pre-processor 6, linear processor array 4 and output post-processor 14 have been omitted.

In accordance with the invention, power savings are achieved by grouping the components of the processor architecture 2 into clusters, and controlling the voltage and clock frequency of each cluster separately in response to synchronisation signals generated within the processor architecture.

Four clusters are shown in FIG. 1. It will be appreciated that the processor architecture 2 can be clustered into more or less than four clusters, and that different components of the architecture 2 can be included in each cluster.

The first cluster 22 comprises the input pre-processor 6 and input vector buffer 8. As this cluster is connected to the environment outside of the processor architecture 2, the environment dictates the clock frequency of the cluster, and hence the voltage.

The second cluster 24 comprises the output post-processor 14 and output vector buffer 12. Again, as this cluster is connected to the environment outside of the processor architecture 2, the environment dictates its clock frequency, and hence the voltage.

The third cluster 26 comprises the linear processor array 4 and working vector memory 10, and the fourth cluster 28 comprises the global control processor 16 and program memory 18.

Alternatively, the linear processor array 4, working vector memory 10, global control processor 16 and program memory 18 can be placed in separate clusters.

As the SIMD processing engine (linear processing array 4) is now decoupled from the environment outside of the processor architecture 2, the linear processing array 4 can be controlled to facilitate power management. Specifically, the components in the third and fourth clusters 26, 28 can be operated at different clock frequencies to the environment, and can be operated at different clock frequencies to each other, in order to achieve power optimal execution.

A power management circuit 30 is provided in the global control processor 16 for determining an appropriate clock frequency for each of the controllable clusters (i.e. the third and fourth clusters 26, 28 in this illustrated embodiment) and adjusting their respective clock frequency and voltage accordingly.

In accordance with a preferred embodiment of the present invention, and to reduce the additional hardware required to implement a power management scheme into a SIMD processor architecture, the task synchronisation inherent in the global control processor 16 is used to generate the information required by the power management circuit 30.

The synchronisation circuit 20 facilitates the independent operation of the four clusters 22, 24, 26 and 28 by allowing the dynamics of the application code with respect to the vector transfer rate to be identified and thereby allow metrics for the dynamic voltage and frequency scaling (DVFS) to be derived.

The dynamic voltage and frequency scaling (DVFS) scheme according to the present invention basically enables the distribution of the application load over time without affecting the performance of the processor architecture 2 but reducing the power dissipation.

For example, the DVFS scheme according to the present invention can reduce the idle time in the processing cycles shown in FIG. 2.

Figure 3:
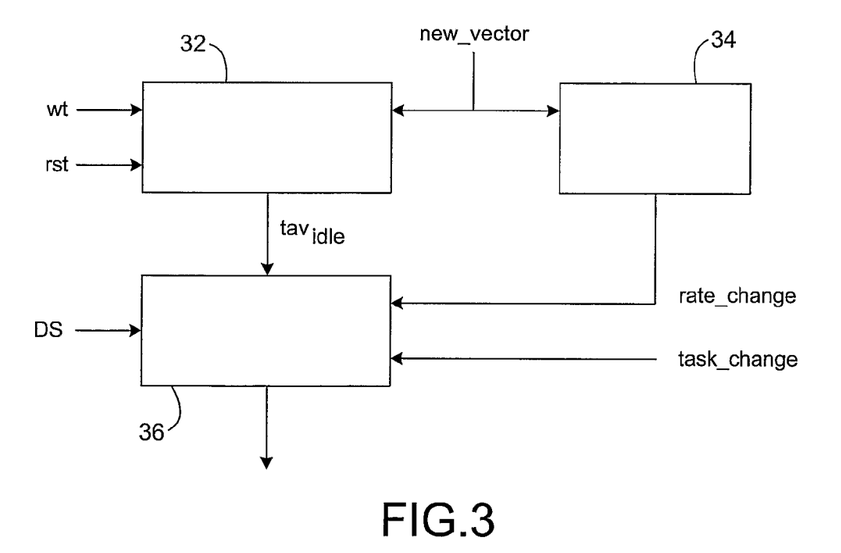
FIG. 3 is a functional diagram of a processor power management block in accordance with the invention.

FIG. 3 shows a functional diagram of a processor power management circuit 30 in accordance with the invention.

The power management block 30 comprises a computation block 32 for computing the average length of the idle portions of the processing cycle, a detection block 34 for detecting a change in the rate that vectors are being provided to the processor architecture 2 and a second computation block 36 for computing the new voltage and frequency settings for a particular cluster.

The first computation block 32 receives the wait signal (as shown in FIG. 2) and a signal indicating the entry of a new vector into the processor architecture 2. The block 32 then calculates the average length of the idle portion over N vector periods. Mathematically, this can be expressed as:

$$tav_{idle} = \Sigma t_{idle}/N$$

The output of block 32, the average length of the idle portions over N vector periods, is provided to the second computation block 36.

The detection block 34 also receives a signal indicating the entry of a new vector into the processor architecture 2 and determines whether the vector rate has increased or decreased. The output of the detection block 34 is a signal indicating the amount of vector rate increase or decrease, and this is provided to the second computation block 36.

The second computation block 36 receives the output of the first computation block 32, the output of the detection block 34, a signal indicating a change in the task being performed by the processor architecture 2 and the default settings for the cluster.

In this illustrated embodiment, the voltage is considered as a function of the clock frequency. It will be appreciated that in a real system there may be other factors which determine the voltage.

Here, the default setting for the cluster is when the clock frequency is at its maximum value:

$$f_0 = f_{max}; V_0 = g(f_0) = g(f_{max})$$

where g( ) is a function.

The second computation block 36 then calculates a new operating condition from $tav_{idle}$ and from the length of a vector period, $t_{vectorperiod}$, as shown below:

$$f_i = h(tav_{idle}, t_{vectorperiod}); V_i = g(f_i)$$

where h( ) is a function.

The new operating clock frequency and voltage are output by block 36.

If the task_change signal indicates that there is a change in the task being performed by the processor architecture 2, the second computation block must reset the operating conditions to the default values:

$$f_i = f_{max}; V_i = g(f_{max})$$

If the output of the detection block 34 indicates that the rate in which vectors are being processed by the system has changed, the clock frequency of the cluster must be adjusted accordingly:

$$f_i = f_{i-1} + \Delta; V_i = g(f_i) \text{ if vector rate increases}$$

$$f_i = f_{i-1} - \Delta; V_i = g(f_i) \text{ if vector rate decreases}$$

where $\Delta$ indicates the magnitude of the vector rate change.

Figure 4:
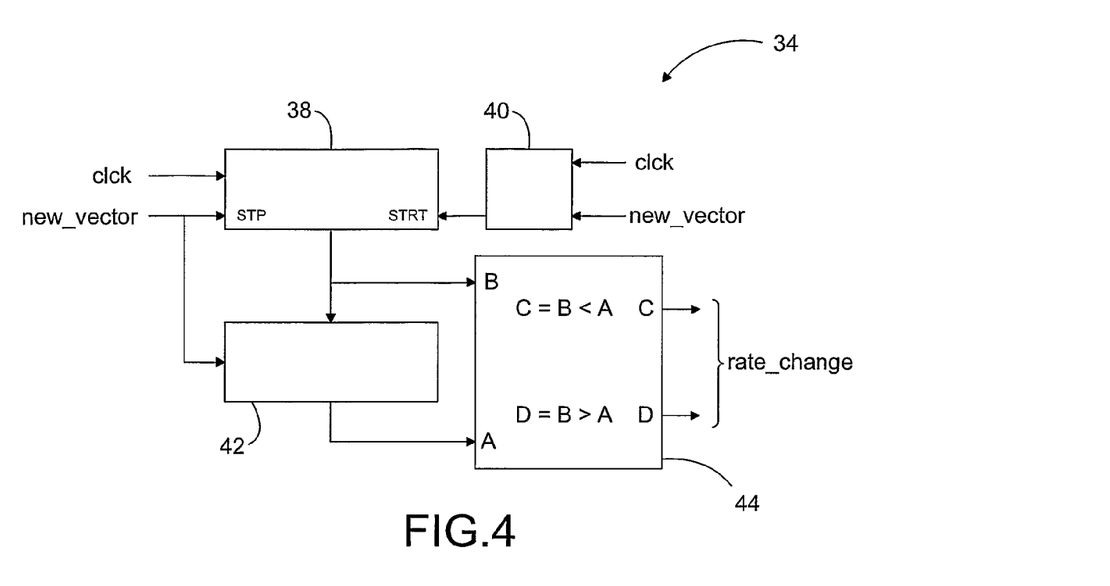
FIG. 4 is a functional diagram of a vector rate change detection block.

FIG. 4 shows a functional diagram of a vector rate change detection block 34. The block 34 comprises a unit 38 for measuring the interval between successive in_ready/new_vector events, this interval being denoted B, a delay unit 40, a latch 42 for storing the previous vector interval, this interval being denoted A, and a unit 44 for comparing A and B to determine whether there has been a change in the vector rate.

When B<A, the vector rate has increased, and the flag C in the rate_change signal indicates this. When B>A, the vector rate has decreased, and the flag D in the rate_change signal indicates this.

Task change can be automatically detected by monitoring the moment of completion of the algorithm per vector, since the cycle count between successive in_ready/new_vector and wait vector events is directly related to the complexity of the algorithm. Comparing the cycle count with a previous average value indicates whether a task change has occurred.

Figure 5:
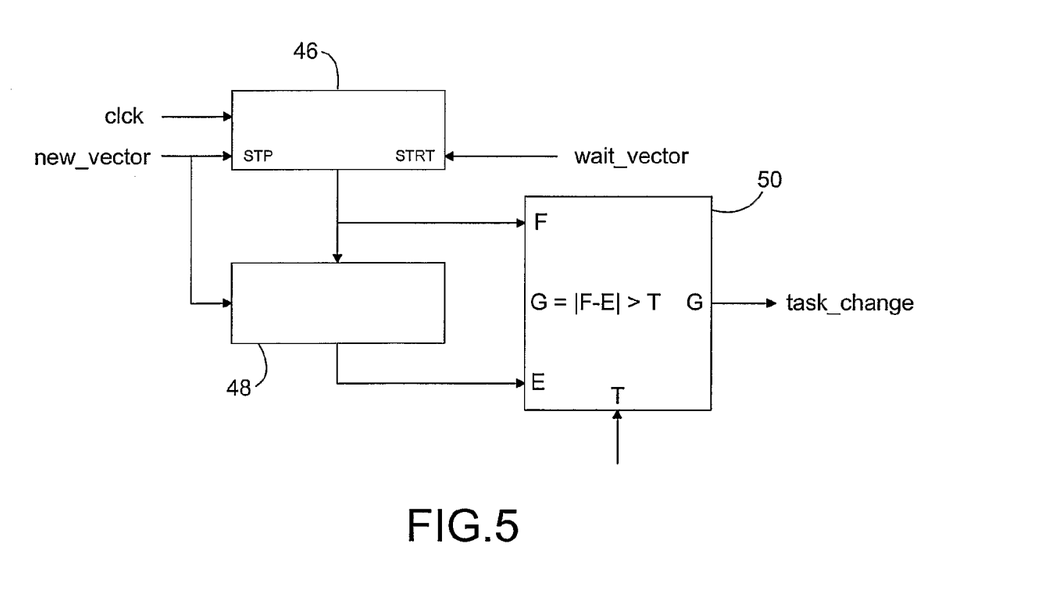
FIG. 5 is a functional diagram of a task change detection block.

FIG. 5 shows a functional diagram of a task change detection block. The block comprises a unit 46 for measuring the time or number of cycles taken to complete a task, which is equal to the time or number of cycles between receiving a wait_vector signal and the next new_vector signal. This time is denoted F. The block further comprises a latch 48 for storing the previous task time, denoted E. A unit 50 compares the magnitude of the difference between E and F (denoted G) with a threshold value, T. If the magnitude of the difference between E and F exceeds the threshold T, i.e. if one of the tasks takes sufficiently longer to complete than the other task, then a task change is determined to have occurred, and the signal G (task_change) indicates this.

The exceptions described above (i.e. the task and vector rate changes) typically occur when the application responds to events, e.g., a camera executing a simple task at a lower date rate during a semi-idle mode switches to a complex task at a higher data rate when an interesting object falls into view. The task complexity can vary with type and number of objects.

The power management technique proposed herein can be used in power-critical applications, for example in mobile video, audio or graphics processing platforms. The same SIMD processor in a mobile device can provide video-phone functionality, e.g. front-end sensor data processing and display-related processing, or gaming functionality, e.g. graphics processing.

The actual algorithms executed for the video-phone and gaming functionalities can dynamically vary depending on the environment conditions and chosen functionalities. By adapting the operating conditions (i.e. voltage and clock frequency) of the processor to match the application demand, more efficient battery utilization can be achieved.

Figure 6:
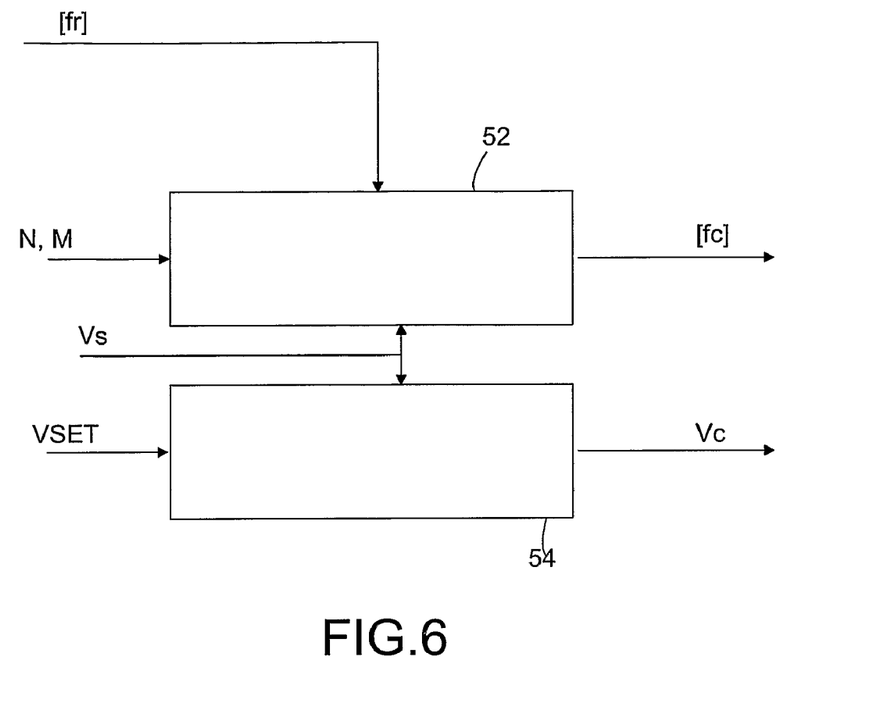
FIG. 6 is a block diagram of circuitry for adjusting the voltage and frequency in each of the clusters in accordance with the invention.

FIG. 6 is a block diagram of circuitry for adjusting the voltage and frequency in each of the clusters in accordance with the invention.

The circuitry comprises a frequency synthesiser 52 that receives a reference clock signal [fr], the frequency settings N, M and the supply voltage Vs. Using the frequency settings N, M, the frequency synthesiser 52 generates the clock signal for the cluster [fc] from the reference clock signal [fr].

The circuitry also comprises a voltage regulator 54 that receives the supply voltage Vs and the voltage setting. This voltage regulator 54 (which is a DC/DC converter) generates voltages in the allowable range, the lower limit being set by the acceptable noise-margin and the upper limit being set by the chosen IC process. The output of the voltage regulator 54 is the voltage for the cluster Vc.

Figure 7:
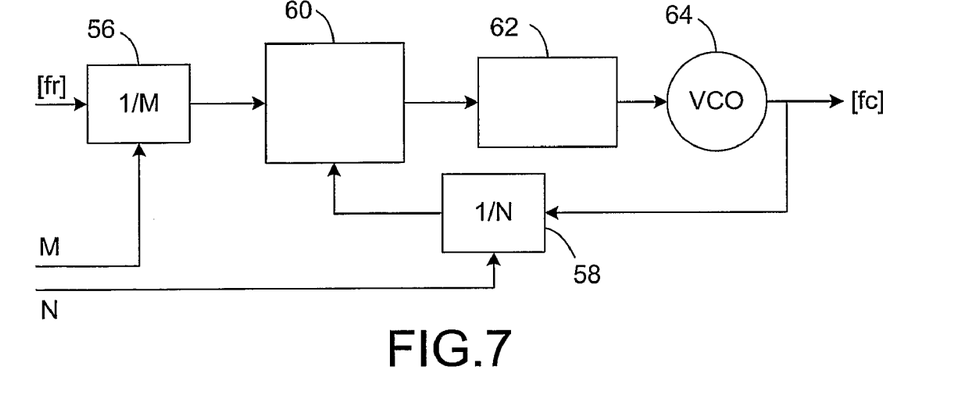
FIG. 7 shows one implementation of a frequency synthesiser for use in the processor architecture according to the invention.

FIG. 7 shows one implementation of a controllable frequency synthesiser 52 for use in the processor architecture according to the invention. This controllable frequency synthesiser is based on a traditional phase/frequency locked loop (PLL/FLL). The synthesiser comprises first and second frequency dividers 56 and 58, a phase/frequency detector 60, a low pass filter 62 and voltage-controlled oscillator 64.

The first frequency divider 56 divides the clock reference signal [fr] by the frequency setting M and provides its output to the phase/frequency detector 60. The second frequency divider 58 divides the cluster clock signal [fc] by the frequency setting N and provides its output to the phase/frequency detector 60.

The phase/frequency detector 60, low pass filter 62 and voltage-controlled oscillator 64 are connected together as in a conventional phase-locked loop. The output of the voltage-controlled oscillator 64 is the cluster clock signal [fc].

In principle, this approach to generating the cluster clock signal [fc] can provide fine frequency resolution when the low-pass filter 62 and the voltage-controlled oscillator 64 are realized using analog circuits. However, the need for off-chip components and the PLL dynamics make it a less attractive approach.

Figure 8:
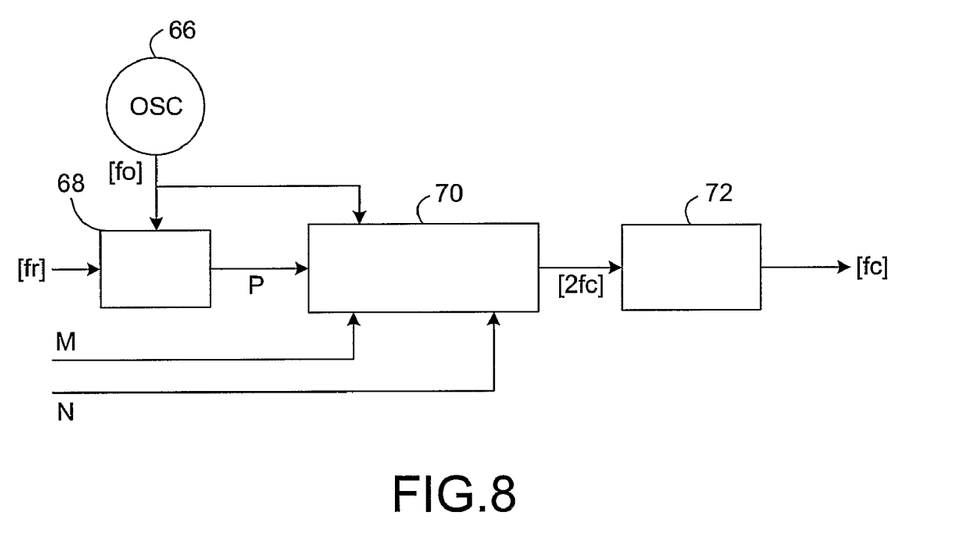
FIG. 8 shows an alternative implementation of a frequency synthesiser for use in the processor architecture according to the invention.

FIG. 8 shows an alternative implementation of a frequency synthesiser for use in the processor architecture according to the present invention. This synthesiser uses the open-loop frequency synthesis (OLFS) technique, which overcomes many of the drawbacks associated with the frequency synthesiser shown in FIG. 7.

This synthesiser comprises a ring oscillator 66 connected to a period counter 68 and pulse generator 70. The period counter 68 receives the clock reference signal [fr] and a frequency [fo] generated by the ring oscillator 66 to generate a period signal P. The pulse generator 68 receives [fo], P and the frequency settings M and N and generates a signal at twice the desired cluster frequency [fc]. A duty cycle corrector 72 corrects the signal produced by the pulse generator 70 to provide the cluster frequency [fc].

This frequency synthesiser utilises the following assumptions about the operation of the processor architecture 2: firstly, frequency adaptation for dynamic power management does not need to have a high resolution, it is sufficient for the processing engine being controlled to get a clock signal that allows the task to be completed in time, the extra savings in power achieved by optimizing to the last MHz/kHz range are not needed, and secondly, since the processing engine is designed with a known maximum performance, the ring-oscillator frequency can be set to this maximum and all that is needed during power management is a frequency divider to generate a lower-frequency cluster clock.

The period counter 68 helps to create a relationship between the reference clock signal [fr] and the cluster clock signal [fc]. In the SIMD architecture the reference clock signal [fr] can be the input/output clock signal that is linked to the external environment.

There is therefore provided a power management technique for single-instruction, multiple-data (SIMD) processor architectures that reduces the power consumption when compared to prior art processor architectures.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a claim enumerating several means, several of these means may be embodied by one and the same item of hardware. The mere fact that certain measures are recited in mutually different dependent claims does not indicate that a combination of these measures cannot be used to advantage.

The invention claimed is:

1. A SIMD processor architecture for processing a stream of data vectors, the architecture comprising:
   a processor array comprising a plurality of processors, each processor being adapted to process a data element in each vector, the operation of the processor array being controlled by a local clock signal having a first frequency;
   a control processor adapted to control the operation of the SIMD processor architecture and generate synchronisation signals to synchronise the operation of the processor array with the stream of data vectors, the operation of the control processor being controlled by a local clock signal having a second frequency; and
   power management means for adjusting the frequencies of the local clock signals in response to the synchronisation signals generated by the control processor, thereby minimising the power consumption of the SIMD processor architecture, wherein the rare at which data vectors arrive at the SIMD processor architecture varies over time, the frequencies of the clock signals are adjusted to reduce the time that the processor array is idle, and the power management means is adapted to compute the average length of time that the processor array is idle during each processing cycle from the synchronisation signals.

2. A SIMD processor architecture as claimed in claim 1, wherein the voltage required by the processor array and control processor is dependent on the frequency of their respective local clock signals.

3. A SIMD processor architecture as claimed in claim 1, wherein the power management means is adapted to adjust the first and second frequencies of the local clock signals separately.

4. A SIMD processor architecture as claimed in claim 1, further comprising a plurality of electronic components, wherein at least one of the plurality of electronic components is clustered with the processor array or the control processor, such that the operation of the at least one component is controlled by the respective local clock frequency of the processor array or the control processor with which it is clustered.

5. A SIMD processor architecture as claimed in claim 4, wherein one of the plurality of electronic components is a working vector memory, and the working vector memory is clustered with the processor array.

6. A SIMD processor architecture as claimed in claim 4, wherein one of the plurality of electronic components is a program memory, and the program memory is clustered with the control processor.

7. A SIMD processor architecture as claimed in claim 4, wherein at least one other electronic component of the plurality of electronic components is controlled by a clock signal having a third frequency.

8. A SIMD processor architecture as claimed in claim 7, wherein the third frequency is equal to the frequency of the clock signal in an environment with which the SIMD processor architecture is connected.

9. A SIMD processor architecture as claimed in claim 8, wherein the at least one other component is an input pre-processor for receiving the data vectors from the environment or an output post-processor for providing the output data vectors to the environment.

10. A SIMD processor architecture as claimed in claim 7, wherein the third frequency is adjusted in response to the synchronisation signals generated by the control processor.

11. A SIMD processor architecture as claimed in claim 10, wherein the at least one other electronic component is clustered with a further at least one other electronic component.

12. A SIMD processor architecture as claimed in claim 1, wherein the power management means is further adapted to detect a change in the rate that data vectors are being received from an environment from the synchronisation signals.

13. A SIMD processor architecture as claimed in claim 12, wherein the power management means is further adapted to compute the values of the frequencies of the clock signals using the computed average length of time that the processor array is idle during each processing cycle and/or the detected change in the rate that data vectors are being received from the environment.

14. A method of minimising the power consumption of a SIMD processor architecture, the SIMD processor architecture being suitable for processing a stream of data vectors and comprising:
- a processor array having a plurality of processors, each processor being adapted to process a data element in each data vector, the operation of the processor array being controlled by a local clock signal having a first frequency; and
- a control processor adapted to control the operation of the SIMD processor architecture and generate synchronisation signals to synchronise the operation of the processor array with the stream of data vectors, the operation of the control processor being controlled by a local clock signal having a second frequency;

the method comprising:
- adjusting the frequencies of the local clock signals in response to the synchronisation signals generated by the control processor; and
- computing the average length of time that the processor array is idle during each processing cycle from the synchronisation signals.

15. A method as claimed in claim 14, further comprising the step of:
- detecting a change in the rate that data vectors are being received from an environment to which the SIMD processor architecture is connected from the synchronisation signals.

* * * * *